United States Patent [19]

Grzinia

[11] Patent Number: 4,514,432

[45] Date of Patent: Apr. 30, 1985

[54] HEN-EGG ALBUMEN SUBSTITUTE AND METHOD FOR ITS MANUFACTURE

[75] Inventor: Michael Grzinia, Schwaikheim, Fed. Rep. of Germany

[73] Assignee: Milei GmbH, Leutkirch, Fed. Rep. of Germany

[21] Appl. No.: 479,006

[22] Filed: Mar. 25, 1983

[30] Foreign Application Priority Data

Mar. 30, 1982 [DE] Fed. Rep. of Germany ....... 3211681

[51] Int. Cl.$^3$ ............................ A23J 3/02; A23J 1/02
[52] U.S. Cl. ..................................... 426/656; 426/564; 426/657
[58] Field of Search .............. 426/583, 564, 614, 656, 426/657

[56] References Cited

U.S. PATENT DOCUMENTS

| | | | |
|---|---|---|---|
| 4,029,825 | 6/1977 | Chang | 426/657 |
| 4,089,987 | 5/1978 | Chang | 426/657 |
| 4,103,038 | 7/1978 | Roberts | 426/657 |
| 4,251,567 | 2/1981 | Ohyabu et al. | 426/657 |
| 4,267,100 | 5/1981 | Chang et al. | 426/614 |

*Primary Examiner*—Raymond Jones
*Assistant Examiner*—Marianne S. Minnick
*Attorney, Agent, or Firm*—Kenway & Jenney

[57] ABSTRACT

A method is given for manufacturing a hen-egg albumen substitute, with which a dried protein is dry-mixed with a salt mixture having the following composition:

| | |
|---|---|
| Monocalcium phosphate | 47.3–33.9% by weight |
| Calcium hydroxide | 38.7–26.1% by weight |
| Calcium chloride | 6.0–20.0% by weight |
| Calcium stearate | 3.0–20.0% by weight |
| Xanthane | 3.0–20.0% by weight | wherein the weight ratio of monocalcium phosphate to calcium hydroxide is between 1.0:1 and 1.3:1.

12 Claims, No Drawings

HEN-EGG ALBUMEN SUBSTITUTE AND METHOD FOR ITS MANUFACTURE

The invention relates to a method of manufacturing a hen-egg albumen substitute.

Hen-egg albumen is a substance which may be beaten to foam and will remain as foam for a long time. Such substances are used, for example, in the manufacture of meringues or for marshmallow-type fillings.

Various attempts have already been made to substitute the albumen used for these purposes by other substances, for example by modified whey proteins and corresponding additives. In this connection reference is made to German laid-open papers DE-OS 17 67 800, DE-OS 26 21 965 and DE-OS 27 41 670.

In the case of all the known methods the manufacture of protein, which may be beaten to foam and which is to be used as a hen-egg albumen substitute, was extremely complicated and costly. In addition, products were obtained, which could be beaten to foam as required but did not, when heated either in hot air or through contact with hot water or a hot sugar solution, have the desired denaturation qualities, which are found in hen-egg albumen. The denaturation qualities are, however, important for processing, in particular in the case of products having a marshmallow-type filling.

It has also been shown in the case of known methods that proteins which contain fat have very poor qualities with regard to heating to foam so that, in practice, the only proteins which can be used for this purpose are those which contain no fat or are at least low in fat.

The object of the invention is to specify a method, with which a hen-egg albumen substitute may be produced from proteins, this albumen substitute conforming to or even surpassing the characteristics of hen-egg albumen with regard to its qualities of beating to foam and denaturation (coagulation due to heat).

It has been surprisingly established that the simplest way, in which a hen-egg albumen substitute may be produced, is by dry mixing a dried protein, for example a dried whey protein, with a salt mixture which has a predetermined composition. In this simple way and without any additional treatment a mixture is obtained, which is at least equal to hen-egg albumen with regard to its qualities of beating to foam and denaturation and which is also, as required, neutral in taste. In the case of a preferred embodiment of the invention the salt mixture has the following composition:

| Monocalcium phosphate | 37.2-38.7% by weight |
|---|---|
| Calcium hydroxide | 33.8-32.3% by weight |
| Calcium chloride | 13% by weight |
| Calcium stearate | 8% by weight |
| Xanthane | 8% by weight |

It is advantageous for the total proportion of the salt mixture in the total dry mixture to be between 12.5 and 20% by weight, preferably 17.6% by weight.

It is particularly advantageous for the weight ratio of monocalcium phosphate to calcium chloride to be between 1.2:1 and 1.3:1.

A further object of the invention is to propose a hen-egg albumen substitute, the qualities of which are at least equal to those of hen-egg albumen with regard to beating to foam and denaturation.

The basis for production of the inventive albumen substitute is a dry protein which may be produced in various ways known per se. In the following, the procedure is explained on the basis of whey protein. However, other proteins may be used, for example vegetable proteins (soybean protein, potato protein) or meat and fish albumins.

When using whey protein this can be obtained, for example, via anion/cation exchanger or by a heat, acid or alkali precipitation. The whey protein is preferably produced by ultrafiltering and subsequently spray drying sweet whey. This results in an enrichment of the protein as well as a reduction in dissolved salts and lactose.

The dry whey protein obtained in this way is dry-mixed with the inventive salt mixture and homogenized, the proportion of the salt mixture being between 12.5 and 20% by weight, preferably 17.6% by weight.

The individual components of the salt mixture work in different ways. The monocalcium phosphate aids in the beating of the whey protein to foam and also serves simultaneously as a buffer. The calcium hydroxide aids in the beating of the whey protein to foam and serves at the same time to increase the pH-value.

Calcium chloride effects an improvement in the beating of the whey protein to foam and at the same time in the desired denaturation qualities, i.e. the coagulation of the protein by heat.

Calcium stearate aids the beating of the whey protein to foam and increases the fluidity of the dry particles in the mixture.

Finally, xanthane delays the separation of serum from the hen-egg albumen substitute beaten to foam so this will keep considerably longer.

The taste of the inventive hen-egg albumen substitute is almost neutral and typical of an egg; the substance does not have the bitter tang or flavour which is often found in proteins, which may be beaten to foam and are produced by hydrolysis.

The qualities of the product beaten to foam with regard to its stability and capability of being beaten to foam result from the following example:

EXAMPLE 1

A 10% aqueous solution of dry hen-egg albumen was beaten to foam with a whisk (Hobart N 50, speed 3) for 3.5 minutes.

Similarly, a 10% aqueous solution of an inventive hen-egg albumen substitute was beaten to foam in the same way for 3.5 minutes. The proportion of salt mixture in the total mixture was 17.6% by weight for the hen-egg albumen substitute, the salt mixture being composed as follows:

| Monocalcium phosphate | 36.8% by weight |
|---|---|
| Calcium hydroxide | 34.2% by weight |
| Calcium chloride | 13.0% by weight |
| Calcium stearate | 8.0% by weight |
| Xanthane | 8.0% by weight |

TABLE 1

| Product | Solution | Beating to foam Min. | Foam density g/ml | Coagulation behavior of foam with boiling water | Serum separation/Min. Foam | Coagulated Foam (denatured) |
|---|---|---|---|---|---|---|
| Dry hen- | 10% | 3.5 | 0.06 | good | 30 | 15 |

TABLE 1-continued

| Product | Solution | Beating to foam Min. | Foam density g/ml | Coagulation behavior of foam with boiling water | Serum separation/Min. Foam | Serum separation/Min. Coagulated Foam (denatured) |
| --- | --- | --- | --- | --- | --- | --- |
| egg albumen Whey protein with beating-to-foam aid in dry form | 10% | 3.5 | 0.06–0.08 | good | no serum separation after 24 hrs. | 90 |

Table 1 shows that the foam density was similar in both cases and that in both cases the foam coagulated with boiling water. Whereas a considerable separation of serum from the foam was observed after 30 minutes in the case of the dry hen-egg albumen, the foam produced with the inventive hen-egg albumen substitute did not show such a separation; even after 24 hours the foam was still stable. A separation of serum in the coagulated foam was already seen after 15 minutes in the case of the dry hen-egg albumen but not until after 90 minutes in the case of the inventive hen-egg albumen substitute.

This clearly shows that the inventive hen-egg albumen substitute behaves considerably better when beaten to foam than the dry hen-egg albumen.

The inventive hen-egg albumen substitute is well suited for the production of meringue. This results from the following example:

EXAMPLE 2

In the case of a batch-by-batch production 15 g hen-egg albumen substitute, as described in Example 1, were dry mixed with 15 g saccharose and then 135 g water added. This mixture was beaten until stiff at fast speed. 200 to 250 g of dry icing sugar were then folded in slowly. The resulting mass was placed on paper-lined trays and dried at an initial temperature of 100° to 120° C., the temperature then falling (60°–80° C.). Before drying the mass had a density of between 0.18 and 0.22 g/ml, i.e. an increase in volume of 620 to 450%.

In the case of continuous production with pressure beating machines the recipe ingredients were beaten to foam in one step whereby a density of 0.1 g/ml was obtained (increase in volume of 1000%).

Favourable results were shown during production of marshmallow-type masses, as results from the following example:

EXAMPLE 3

The production was continuous in a pressure beating machine, in which 7.5% by weight of the inventive hen-egg albumen substitute was dry mixed with 1.0% by weight of instant gelatine (type A) and 25.0% by weight saccharose and, subsequently, 66.5% by weight of water added.

A sugar solution with 15% by weight water, 57% by weight saccharose and 28% by weight dextrose/dry glucose was boiled to 110° to 112° C. and added to the foam mixture at 90°–95° C. The ratio of foam mixture to sugar solution was thereby 1:3.

This resulted in a denatured mass having a density of between 0.18 and 0.22 g/ml.

These masses kept fresh for several weeks.

I claim:

1. Method for manufacturing aa hen-egg albumen substitute comprising dry-mixing a protein mixture comprising 35 to 90% by weight protein and a salt mixture comprising:

33.9 to 47.3% by weight Monocalcium phosphate
   26.1 to 38.7% by weight Calcium hydroxide
   6.0 to 20% by weight Calcium chloride
   3.0 to 20.0% by weight Calcium Stearate
   3.0 to 20.0% by weight Xanthane wherein the weight ratio of monocalcium phosphate to calcium hydroxide is between 1.0:1.0 and 1.3:1.0, and wherein the salt mixture comprises 12.5 to 20% by weight of the total dry mixture.

2. The method according to claim 1 wherein said protein mixture comprises dry whey protein.

3. Method according to claim 1, wherein the salt mixture comprises:

| Monocalcium phosphate | 37.2–38.7% by weight |
| --- | --- |
| Calcium hydroxide | 33.8–32.3% by weight |
| Calcium chloride | 13% by weight |
| Calcium stearate | 8% by weight |
| Xanthane | 8% by weight |

4. Method according to claim 3, wherein the proportion of the salt mixture in the total dry mixture is between 12.5 and 20% by weight.

5. Method according to claim 4, wherein the proportion of the salt mixture in the total dry mixture is 17.6% by weight.

6. Method according to claims 1, 3, 4, and 5 wherein the weight ratio of monocalcium phosphate to calcium hydroxide is between 1.2:1 and 1.3:1.

7. A hen-egg albumen substitute comprising a mixture of a dried protein mixture and a salt mixture, wherein said salt mixture comprises:

33.9 to 47.3% by weight Monocalcium phosphate
   26.1 to 38.7% by weight Calcium hydroxide
   6.0 to 20.0% by weight Calcium Chloride
   3.0 to 20.0% by weight Calcium Stearate
   3.0 to 20.0% by weight Xanthane wherein the weight ratio of monocalcium phosphate to calcium hydroxide is between 1.0:1 and 1.3:1, and wherein the salt mixture comprises 12.5 to 20 percent by weight of the total dry mixture.

8. The hen-egg albumen substitute of claim 7 wherein said protein mixture comprises dried whey protein.

9. Hen-egg albumen substitute according to claim 7 wherein the salt mixture comprises:

| Monocalcium phosphate | 37.2–38.7% by weight |
| --- | --- |
| Calcium hydroxide | 32.3–33.8% by weight |
| Calcium chloride | 13% by weight |
| Calcium stearate | 8% by weight |
| Xanthane | 8% by weight |

10. Hen-egg albumen substitute according to claim 7, wherein the proportion of the salt mixture in the total dry mixture is between 12.5 and 20% by weight.

11. Hen-egg albumen substitute according to claim 10, wherein the proportion of the salt mixture in the total dry mixture is 17.6% by weight.

12. Hen-egg albumen substitute according to claims 7, 9, 10, and 11 wherein the weight ratio of monocalcium phosphate to calcium hydroxide is between 1.2:1 and 1.3:1.

* * * * *